(12) United States Patent
Reber et al.

(10) Patent No.: US 11,596,158 B1
(45) Date of Patent: Mar. 7, 2023

(54) COOK TOP PRESS ASSEMBLIES

(71) Applicants: Joseph Edward Reber, Grand Rapids, MI (US); Dennis Leon Unruh, Canton, KS (US)

(72) Inventors: Joseph Edward Reber, Grand Rapids, MI (US); Dennis Leon Unruh, Canton, KS (US)

( * ) Notice: Subject to any disclaimer, the term of this patent is extended or adjusted under 35 U.S.C. 154(b) by 448 days.

(21) Appl. No.: 16/565,170

(22) Filed: Sep. 9, 2019

Related U.S. Application Data

(60) Provisional application No. 62/728,209, filed on Sep. 7, 2018.

(51) Int. Cl.
*A47J 37/06* (2006.01)
*A22C 7/00* (2006.01)
*A47J 37/10* (2006.01)

(52) U.S. Cl.
CPC ......... *A22C 7/0084* (2013.01); *A47J 37/0611* (2013.01); *A47J 37/108* (2013.01); *A47J 2037/0617* (2013.01)

(58) Field of Classification Search
CPC ...... A47J 37/108; A47J 37/0611; A47J 43/20; A47J 2037/0617
USPC ........... 99/349; 100/226, 227, 228, 257, 315
See application file for complete search history.

(56) References Cited

U.S. PATENT DOCUMENTS

| 1,989,287 | A | * | 1/1935 | Parr | A47J 43/20 99/426 |
| 2,708,400 | A | * | 5/1955 | Tait | B42C 9/0043 100/226 |
| 4,484,516 | A | * | 11/1984 | Bimman | A47J 37/108 99/349 |
| 4,697,504 | A | * | 10/1987 | Keating | A47J 37/0611 126/41 R |
| 2014/0123861 | A1 | * | 5/2014 | Cooper | A47J 37/0611 99/372 |

* cited by examiner

*Primary Examiner* — Reginald Alexander
(74) *Attorney, Agent, or Firm* — Elliott Law PLLC; Douglas H. Elliott; Nathan Q. Huynh

(57) ABSTRACT

Described herein are assemblies, for example, cook top press assemblies for pressing food item on a stove, which cook top press assemblies may include: a first bracket coupled to the stove; a second bracket coupled to the stove; a cross bar having a first end coupled to the first bracket and a second end coupled to the second bracket; a cross sleeve slidably and rotatably coupled to the cross bar; a lateral bar having a first end coupled to the cross sleeve, wherein the lateral bar may be orthogonal to the cross bar; a lateral sleeve slidably coupled to the lateral bar, wherein the lateral sleeve may have a knob; a plate having a finger; a pin extending through the knob and the finger, wherein the finger may be pivotable on the pin; and a handle coupled to the plate.

1 Claim, 6 Drawing Sheets

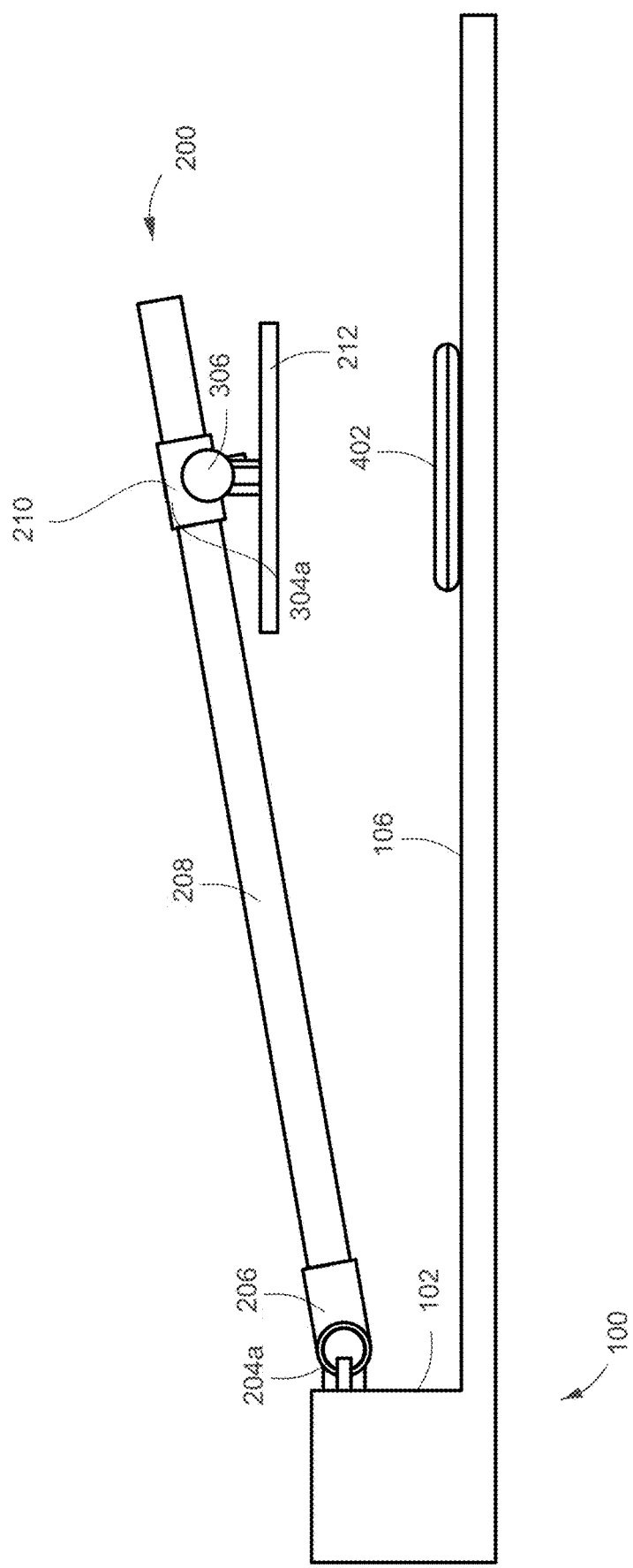

_____

COOK TOP PRESS ASSEMBLIES

CROSS REFERENCE TO RELATED APPLICATIONS

This application claims benefit to U.S. Provisional Application No. 62/728,209, filed on Sep. 7, 2018; and this application hereby incorporates herein U.S. Provisional Application No. 62/728,209 as if set forth herein in its entirety.

BACKGROUND

1. Field of Inventions

The field of this application and any resulting patent is cook top press assemblies.

2. Description of Related Art

Various cook top press assemblies and methods for pressing food items have been proposed and utilized. However, those methods and structures lack the combination of steps and/or features of the methods and/or structures covered by what is disclosed herein. Furthermore, it is contemplated that the methods and/or structures disclosed herein solve many of the problems that prior art methods and structures have failed to solve. Also, the methods and/or structures disclosed herein have benefits that would be surprising and unexpected to a hypothetical person of ordinary skill with knowledge of the prior art existing as of the filing date of this application.

SUMMARY

The disclosure herein includes an assembly, for example, a cook top press assembly for pressing a food item (e.g., hamburger patty) on a stove (e.g., a heatable hamburger cooking surface), which cook top press assembly may include: a first bracket coupled to the stove; a second bracket coupled to the stove; a cross bar having a first end coupled to the first bracket and a second end coupled to the second bracket; a cross sleeve slidably and rotatably coupled to the cross bar; a lateral bar having a first end coupled to the cross sleeve, wherein the lateral bar may be orthogonal to the cross bar; a lateral sleeve slidably coupled to the lateral bar, wherein the lateral sleeve may have a knob; a plate having a finger, wherein the plate may have a lower surface capable of being abutted against a cooking surface of the stove; a pin extending through the knob and the finger, wherein the finger may be pivotable on the pin; and a handle coupled to the plate.

The disclosure herein includes an assembly, for example, a cook top press assembly for pressing a food item (e.g., hamburger patty) on a stove (e.g., a heatable hamburger cooking surface), which cook top press assembly may include: a cross bar coupled to the stove; a lateral bar coupled to the cross bar; a lateral sleeve coupled to the lateral bar; a plate coupled to the lateral sleeve and capable of being abutted against a cooking surface of the stove; and a handle coupled to the lateral sleeve or the plate; wherein the cross bar may have a first end rotatably coupled to a first bracket coupled to a wall of the stove, a second end rotatably coupled to a second bracket coupled to the wall of the stove, and a middle portion, between the first end and the second end, that, in some cases, may not physically touch the wall of the stove; wherein the lateral bar may be orthogonal to and rotatably coupled to the cross bar; wherein the lateral sleeve may have a knob and is slidable on the lateral bar; wherein the plate may have a lower surface, an upper surface, and a finger extending from the upper surface, wherein the knob and the finger may have a pin extended therethrough; and wherein the plate may be pivotable relative to the lateral sleeve.

The disclosure herein includes an assembly, for example, a cook top press assembly for pressing a food item (e.g., hamburger patty) on a stove (e.g., a heatable hamburger cooking surface), which cook top press assembly may include: a first bracket having a first bracket portion and a second bracket portion, wherein the first bracket portion of the first bracket may be coupled to a wall of the stove; a second bracket coupled to the stove having a first bracket portion and a second bracket portion, wherein the first bracket portion of the second bracket may be coupled to the wall of the stove; a cross bar having a first end coupled to the second bracket portion of the first bracket and a second end coupled to second bracket portion of the second bracket, wherein the cross bar may have a portion between the first end and the second that does not physically touch the wall of the stove; a cross sleeve slidably and rotatably coupled to and concentric with the cross bar; a lateral bar having a first end coupled to the cross sleeve, wherein the lateral bar may be orthogonal to the cross bar; a lateral sleeve slidably coupled to and concentric with the lateral bar, wherein the lateral sleeve may have a knob; a plate having a lower surface, an upper surface, a finger extending from the upper surface, wherein the plate may have a lower surface capable of being abutted against a cooking surface of the stove; a pin extending through the knob and the finger, wherein the finger may be pivotable on the pin; and a handle coupled to the plate.

The disclosure herein includes an assembly, for example, a cook top press assembly for pressing a food item (e.g., hamburger patty) on a stove (e.g., a heatable hamburger cooking surface), which cook top press assembly may include: a cross bar coupled to the stove; a lateral bar rotatably coupled to the cross bar; and a plate pivotably and slidably coupled to the lateral bar, the plate capable of being abutted against a cooking surface of the stove.

The disclosure herein includes an assembly, for example, a cook top press assembly for pressing a food item (e.g., hamburger patty) on a stove (e.g., a heatable hamburger cooking surface), which cook top press assembly may include: a cross bar coupled to the stove; a lateral bar rotatably coupled to the cross bar; and a plate pivotably coupled to the lateral bar.

The disclosure herein includes a method of pressing a food item (e.g., hamburger patty) cooking on a stove (e.g., a heatable hamburger cooking surface), which method may include: lifting a plate pivotably coupled to a lateral bar pivotably coupled to a cross bar coupled to the stove; and abutting the plate against the food item.

The disclosure herein includes a method of pressing a food item (e.g., hamburger patty) cooking on a stove (e.g., a heatable hamburger cooking surface), which method may include: lifting a plate; sliding a cross sleeve along a cross bar, wherein a lateral bar having a first end is coupled to the cross sleeve and a second end pivotably coupled to the plate; and abutting the plate against the food item.

BRIEF DESCRIPTION OF THE DRAWINGS

FIG. 4A illustrates a side view of a stove coupled to a cook top press assembly in a lift position.

DETAILED DESCRIPTION

1. Introduction

Figure 1A:
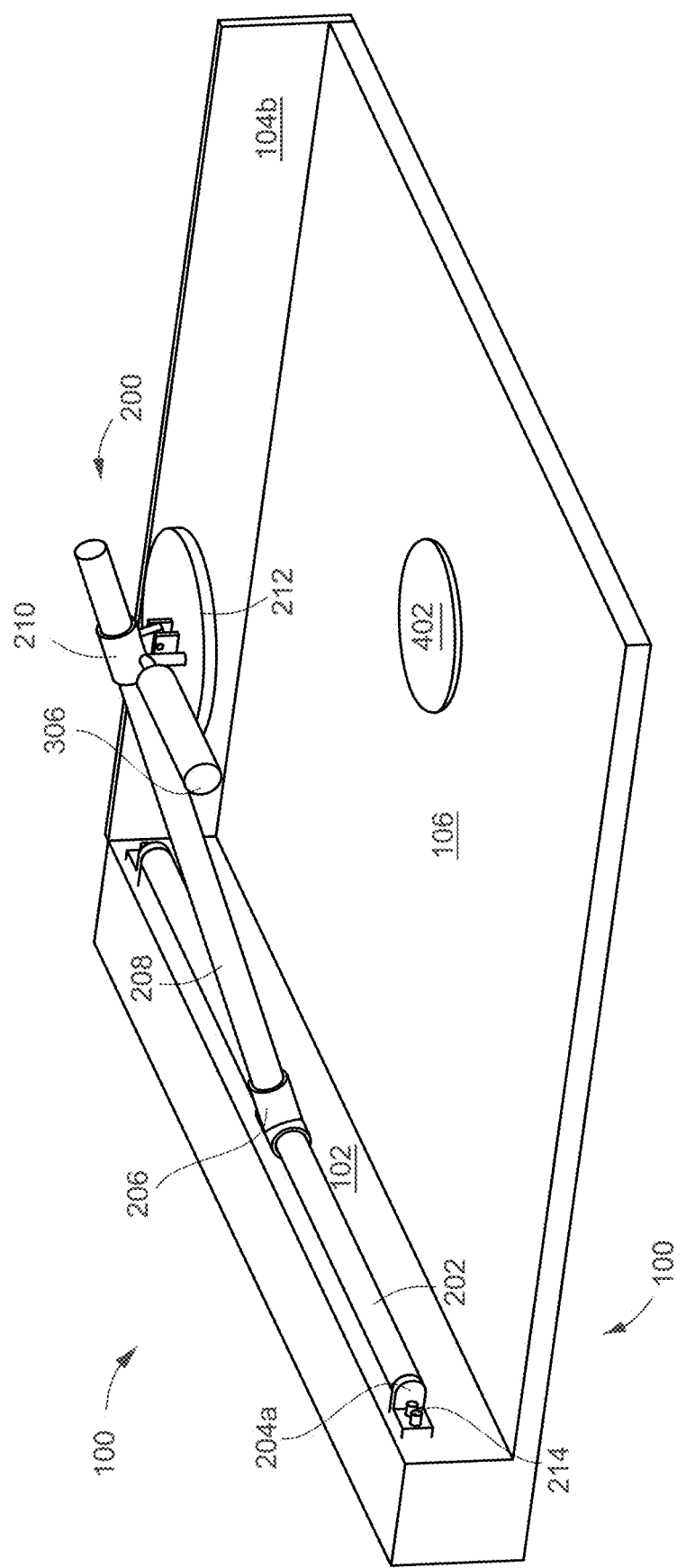
FIG. 1A illustrates a perspective view of a stove and a cook top press assembly coupled thereto, in which the cook top press assembly is in a lift position.

A detailed description will now be provided. The purpose of this detailed description, which includes the drawings, is to satisfy the statutory requirements of 35 U.S.C. § 112. For example, the detailed description includes a description of the inventions disclosed herein and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details of the systems, nor do they limit the scope of the disclosure herein.

2. Selected Definitions

Various terms as used herein are expressly defined below.

The term "aligning" as used herein is defined as a verb that means manufacturing, forming, adjusting, or arranging one or more physical objects into a particular position. After any aligning takes place, the objects may be fully or partially "aligned." Aligning preferably involves arranging a structure or surface of a structure in linear relation to another structure or surface; for example, such that their borders or perimeters may share a set of parallel tangential lines. Additionally, a plurality of jumper apertures of a terminal block may be aligned in a row. In certain instances, the aligned borders or perimeters may share a similar profile.

The term "aperture" as used herein is defined as any opening in a solid object or structure. For example, an aperture may be an opening that begins on one side of the solid object and ends on the other side of the object. An aperture may be round. An aperture may be polygonal-shaped, e.g., triangular, square, rectangular, pentagonal, hexagonal. An aperture may alternatively be an opening that does not pass entirely through the object, but only partially passes through, e.g., a groove. An aperture can be an opening in an object that is completely circumscribed, defined, or delimited by the object itself. Alternatively, an aperture can be an opening in the object formed when the object is combined with one or more other objects or structures. An aperture may be disposed in and passed entirely through a structure, e.g., bracket, cross sleeve, lateral sleeve, or plate. An aperture may receive another object and permit ingress and/or egress of the object through the aperture. Thus, a cross bar may be received in an aperture of a cross sleeve.

The term "assembly" as used herein is defined as any set of components that have been fully or partially assembled together. A group of assemblies may be coupled to form a structure having an inner surface and an outer surface.

The term "coupled" as used herein is defined as directly or indirectly connected, attached, or unitary, e.g., part of. A first object may be coupled to a second object such that the first object is positioned at a specific location and orientation with respect to the second object. For example, a cook top press assembly may be coupled to a back wall of a stove. A first object may be permanently, removably, slidably, pivotably, and/or threadably coupled to a second object. Two objects may be permanently coupled to each other via adhesive or welding. For example, a cross sleeve may be permanently coupled to an end of a lateral bar. Two objects may be removably coupled to each other via screws, nuts and bolts, threads, tape, latches, hooks, fasteners, locks, male and female connectors, clips, clamps, and/or surface-to-surface contact. For example, a cross bar may be removably coupled to brackets such that the cross bar may then be uncoupled and removed from the brackets. A bolt may be inserted through apertures disposed in fingers of a lateral sleeve and a knob of a plate to removably couple the lateral sleeve and the plate such that the bolt may then be removed from the apertures. Two objects may be slidably coupled together, e.g., where an inner aperture of one object is capable of receiving a second object. For example, a lateral bar extended through an aperture of lateral sleeve may be slidably coupled to the lateral sleeve. In another example, a cross bar extended through an aperture of cross sleeve may be slidably coupled to the cross sleeve. Two objects may be rotatably coupled when one object connects with the other and one object remains free to rotate about the other. For example, a cross sleeve having an aperture that receives a cross bar and capable of rotating about the cross bar is rotatably coupled to the cross bar. Additionally, two objects may be threadably coupled where a threaded outer surface of one object is capable of engaging with or to a threaded inner surface of another object. Threadably coupled objects may be removably coupled. Accordingly, a bolt may be threadably coupled to a back wall of a stove where a threaded inner surface, e.g., box threads or female threads, of the wall may be engaged with a threaded outer surface, e.g., pin threads or male threads, of the bolt.

The term "cylindrical" as used herein is defined as shaped like a cylinder, e.g., having straight parallel sides and a circular or oval or elliptical cross-section. A cylindrical body or structure may be completely or partially shaped like a cylinder. A cylindrical body may be a cross bar, a cross sleeve, a lateral bar, a lateral sleeve, or a plate. A cylindrical body that has an outer diameter that changes abruptly may have a radial face or "groove" extending toward the center axis line. A cylindrical body may have an aperture that extends through the entire length of the body to form a hollow cylinder. On the other hand, a cylindrical structure may be solid, e.g., rod or peg. A cross bar and a lateral bar are examples of a solid cylindrical body.

The terms "first" and "second" as used herein merely differentiate two or more things or actions, and do not signify anything else, including order of importance, sequence, etc.

The term "groove" as used herein is defined as an indentation in a surface. A groove may extend in a straight line from one end to another. A groove may be a continuous loop, e.g., around a cylindrical structure. A groove may extend in a meandering path from end to another, e.g., a S-shaped or C-shaped path. A groove may have a cross-section that is V-shaped. A groove may have a cross-section that is rectangular. A groove may have a cross-section that is arcuate, e.g., U-shaped.

The term "handle" as used herein as a noun is defined as a structure configured for grasping by a human hand. A handle may be coupled to a plate. A handle may be coupled to a lateral sleeve. A handle may be coupled to a lateral bar.

The term "orthogonal" as used herein is defined as at an angle ranging from 85° or 88 to 92° or 95°, e.g., to a line, a plane, or a surface. Two structures that are orthogonal to each other may be perpendicular and/or tangential to each other.

The term "plate" as used herein is defined as a structure configured for disposing onto a food item. A plate may have a lower surface and an upper surface. A plate may have one or more protrusions extending from an upper surface of the plate. A plate may have one or more protrusions pivotably coupled to a lateral sleeve. A plate may have a handle coupled thereto.

The term "providing" as used herein is defined as making available, furnishing, supplying, equipping, or causing to be placed in position.

The term "stove" as used herein is defined as any apparatus on which fuel is burned or electricity is used to provide heat, e.g., for cooking or heating. A grill, a griddle, a cook range, an oven, a burner, a microwave, a salamander, a smoker, a roaster, a broiler, a toaster, a barbeque pit, a rotisserie, a brazier, a furnace, a fireplace, and a hearth are examples of a stove. A stove may have a surface capable of receiving a food item for cooking or heating. A stove may have a flat surface. A stove may have a surface that conducts heat. A stove may have a surface through which heat may pass. A stove may have a cooking surface that is a grate. A stove may have a solid cooktop surface.

The term "surface" as used herein is defined as any face of a structure. A surface may refer to that flat or substantially flat area that is planar which may, for example, be part of a plate or a sleeve. A surface may refer to that flat or substantially flat area that extends radially around a cylinder which may, for example, be part of a cross bar or a lateral bar. A surface may also refer to that flat or substantially flat area that extend radially within a structure to define a circular-shaped aperture therein which may, for example, be part of a cross bar, a cross sleeve, a lateral bar, of a lateral sleeve. A surface may also refer to that flat or substantially flat area that extend continuously within a structure to define a polygonal-shaped aperture therein which may, for example, be part of a plate. A surface may have irregular contours. A surface may be formed from components, e.g., e.g., a cross bar, a cross sleeve, a lateral bar, a lateral sleeve, and a plate, coupled together. Coupled components may form irregular surfaces.

The term "tubular" as used herein is defined any structure having an inner surface and an outer surface. A tubular may have an aperture disposed therethrough. Preferably, a tubular is cylindrical. However, any or all tubulars of an assembly, e.g., bar, cross sleeve, or lateral sleeve, may have polygonal cross-sections, e.g., triangular, rectangular, pentagonal, hexagonal, or octagonal.

The terms "upper," "lower," "top," "bottom" as used herein are relative terms describing the position of one object, thing, or point positioned in its intended useful position, relative to some other object, thing, or point also positioned in its intended useful position, when the objects, things, or points are compared to distance from the center of the earth. The term "upper" identifies any object or part of a particular object that is farther away from the center of the earth than some other object or part of that particular object, when the objects are positioned in their intended useful positions. The term "lower" identifies any object or part of a particular object that is closer to the center of the earth than some other object or part of that particular object, when the objects are positioned in their intended useful positions. For example, a plate may have an upper surface and a lower surface. Additionally, a cylindrical object, e.g., plate, may have an upper portion and a lower portion. The term "top" as used herein means in the highest position, e.g., farthest from the ground. The term "bottom" as used herein means in the lowest position, e.g., closest the ground. For example, a cylindrical object, e.g., plate, may have a top portion and a bottom portion.

The term "unitary" as used herein is defined as having the nature, properties, or characteristics of a single unit. For example, a plate and a knob that are individual parts may be unitary in the sense they are not separate but rather are formed from a single piece of material, e.g., plastic, carbon fiber, metal, or wood.

The term "wall" as used herein is defined as any structure having a planar surface.

3. Certain Specific Embodiments

The disclosure herein includes an assembly, for example, a cook top press assembly for pressing a food item (e.g., hamburger patty) on a stove (e.g., a heatable hamburger cooking surface), which cook top press assembly may include: a first bracket coupled to the stove; a second bracket coupled to the stove; a cross bar having a first end coupled to the first bracket and a second end coupled to the second bracket; a cross sleeve slidably and rotatably coupled to the cross bar; a lateral bar having a first end coupled to the cross sleeve, wherein the lateral bar may be orthogonal to the cross bar; a lateral sleeve slidably coupled to the lateral bar, wherein the lateral sleeve may have a knob; a plate having a finger, wherein the plate may have a lower surface capable of being abutted against a cooking surface of the stove; a pin extending through the knob and the finger, wherein the finger may be pivotable on the pin; and a handle coupled to the plate.

The disclosure herein includes an assembly, for example, a cook top press assembly for pressing a food item (e.g., hamburger patty) on a stove (e.g., a heatable hamburger cooking surface), which cook top press assembly may include: a cross bar coupled to the stove; a lateral bar coupled to the cross bar; a lateral sleeve coupled to the lateral bar; a plate coupled to the lateral sleeve and capable of being abutted against a cooking surface of the stove; and a handle coupled to the lateral sleeve or the plate; wherein the cross bar may have a first end rotatably coupled to a first bracket coupled to a wall of the stove, a second end rotatably coupled to a second bracket coupled to the wall of the stove, and a middle portion, between the first end and the second end, that, in some cases, may not physically touch the wall of the stove; wherein the lateral bar may be orthogonal to and rotatably coupled to the cross bar; wherein the lateral sleeve may have a knob and is slidable on the lateral bar; wherein the plate may have a lower surface, an upper surface, and a finger extending from the upper surface, wherein the knob and the finger may have a pin extended therethrough; and wherein the plate may be pivotable relative to the lateral sleeve.

The disclosure herein includes an assembly, for example, a cook top press assembly for pressing a food item (e.g., hamburger patty) on a stove (e.g., a heatable hamburger cooking surface), which cook top press assembly may include: a first bracket having a first bracket portion and a second bracket portion, wherein the first bracket portion of the first bracket may be coupled to a wall of the stove; a second bracket coupled to the stove having a first bracket portion and a second bracket portion, wherein the first bracket portion of the second bracket may be coupled to the wall of the stove; a cross bar having a first end coupled to the second bracket portion of the first bracket and a second end coupled to second bracket portion of the second bracket, wherein the cross bar may have a portion between the first end and the second that does not physically touch the wall of the stove; a cross sleeve slidably and rotatably coupled to and concentric with the cross bar; a lateral bar having a first end coupled to the cross sleeve, wherein the lateral bar may be orthogonal to the cross bar; a lateral sleeve slidably coupled to and concentric with the lateral bar, wherein the lateral sleeve may have a knob; a plate having a lower surface, an upper surface, a finger extending from the upper surface, wherein the plate may have a lower surface capable of being abutted against a cooking surface of the stove; a pin extending through the knob and the finger, wherein the finger may be pivotable on the pin; and a handle coupled to the plate.

The disclosure herein includes an assembly, for example, a cook top press assembly for pressing a food item (e.g., hamburger patty) on a stove (e.g., a heatable hamburger cooking surface), which cook top press assembly may include: a cross bar coupled to the stove; a lateral bar rotatably coupled to the cross bar; and a plate pivotably and slidably coupled to the lateral bar, the plate capable of being abutted against a cooking surface of the stove.

The disclosure herein includes an assembly, for example, a cook top press assembly for pressing a food item (e.g., hamburger patty) on a stove (e.g., a heatable hamburger cooking surface), which cook top press assembly may include: a cross bar coupled to the stove; a lateral bar rotatably coupled to the cross bar; and a plate pivotably coupled to the lateral bar.

The disclosure herein includes a method of pressing a food item (e.g., hamburger patty) cooking on a stove (e.g., a heatable hamburger cooking surface), which method may include: lifting a plate pivotably coupled to a lateral bar pivotably coupled to a cross bar coupled to the stove; and abutting the plate against the food item.

The disclosure herein includes a method of pressing a food item (e.g., hamburger patty) cooking on a stove (e.g., a heatable hamburger cooking surface), which method may include: lifting a plate; sliding a cross sleeve along a cross bar, wherein a lateral bar having a first end is coupled to the cross sleeve and a second end pivotably coupled to the plate; and abutting the plate against the food item.

In any one of the methods or structures disclosed herein, the cross bar may be coupled to a stove.

In any one of the methods or structures disclosed herein, the cook top press assembly may further include: brackets coupled to the stove and ends of the crossbar.

In any one of the methods or structures disclosed herein, the cook top press assembly may further include: a first bracket coupled to the stove and a first end of the cross bar; a second bracket coupled to the stove and a second end of the cross bar;

In any one of the methods or structures disclosed herein, the lateral bar may be substantially orthogonal to the cross bar.

In any one of the methods or structures disclosed herein, the lateral bar may be slidably coupled to the cross bar.

In any one of the methods or structures disclosed herein, the cook top press assembly may further include: a cross sleeve pivotably coupled to the cross bar and coupled to the lateral bar.

In any one of the methods or structures disclosed herein, the cook top press assembly may further include: a cross sleeve slidably coupled to the cross bar and coupled to the lateral bar.

In any one of the methods or structures disclosed herein, the plate may be slidably coupled to the lateral bar.

In any one of the methods or structures disclosed herein, the plate may be pivotably coupled to the lateral bar.

In any one of the methods or structures disclosed herein, the plate may have an upper surface and a knob extending from the upper surface, wherein the knob may be pivotably coupled to a lateral sleeve.

In any one of the methods or structures disclosed herein, the plate may further include: a plate having an upper surface; and a handle coupled to the upper surface.

In any one of the methods or structures disclosed herein, the plate may further include apertures disposed therethrough.

In any one of the methods or structures disclosed herein, the cook top press assembly may further include: a cross sleeve pivotably coupled to the cross bar; and a lateral bar coupled to the cross sleeve.

In any one of the methods or structures disclosed herein, the cook top press assembly may further include: a cross sleeve slidably coupled to the cross bar; and a lateral bar coupled to the cross sleeve.

In any one of the methods or structures disclosed herein, the cook top press assembly may further include a lateral sleeve slidably coupled to the lateral bar and coupled to the plate.

In any one of the methods or structures disclosed herein, the cook top press assembly may further include: a lateral sleeve slidably coupled to the lateral bar and coupled to the plate; and the plate having an upper surface and a knob extending from the upper surface, wherein the knob is pivotably coupled to the lateral sleeve.

Any one of the methods disclosed herein may further include sliding along the cross bar a cross sleeve coupled to the lateral bar.

Any one of the methods disclosed herein may further include pivoting the plate into physical contact with the food item.

Any one of the methods disclosed herein may further include lifting a handle coupled to the plate.

4. Specific Embodiments in the Drawings

The drawings presented herein are for illustrative purposes only and do not limit the scope of the disclosure. Rather, the drawings are intended to help enable one having ordinary skill in the art to make and use the assemblies disclosed herein.

This section addresses specific versions of cook top press assemblies shown in the drawings, which relate to assemblies, elements and parts that can be part of a cook top press assembly, and methods for pressing food items. Although this section focuses on the drawings herein, and the specific versions found in those drawings, parts of this section may also have applicability to other versions not shown in the drawings. The limitations referenced in this section should not be used to limit the scope of the versions themselves, which have broader applicability.

Although the methods, structures, elements, and parts described herein have been described in detail, it should be understood that various changes, substitutions, and alterations can be made without departing from the spirit and scope of the versions disclosed herein. Those skilled in the art may be able to study the preferred versions and identify other ways to practice versions disclosed herein that are not exactly as described herein. It is the intent of the applicant that variations and equivalents of the disclosed versions are within the scope of the disclosure, while the description, abstract and drawings are not to be used to limit the scope of the disclosure. The disclosed versions are specifically intended to be as broad as described below and their equivalents.

Figure 1B:
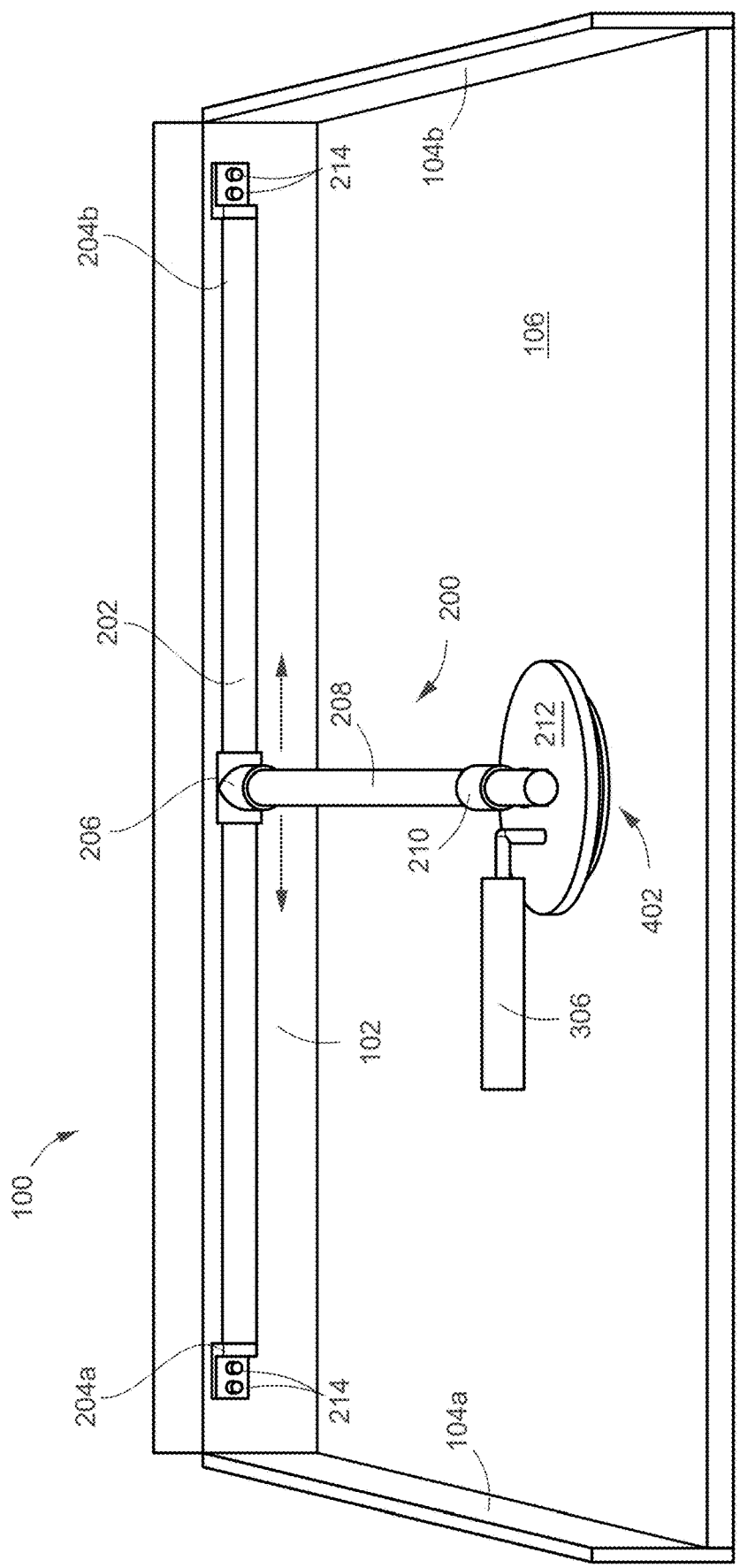
FIG. 1B illustrates a perspective view of a stove and a cook top press assembly coupled thereto, in which the cook top press assembly is in a pressing position.

FIG. 1A illustrates a perspective view of a stove 100 and a cook top press assembly 200 coupled thereto, in which the cook top press assembly 200 may be in a lift position. FIG. 1B illustrates a perspective view of a stove 100 and a cook top press assembly 200 coupled thereto, in which the cook top press assembly 200 may be in a lift position.

Referring to FIGS. 1A-B, the stove 100 may include a back wall 102, two side walls 104a, 104b, and a cook top 106. The cook top 106 may receive food items thereon.

The cook top press assembly 200 may be coupled to the back wall 102 of the stove 100. The cook top press assembly 200 may include a cross bar 202, a first bracket 204a, a second bracket 204b, a cross sleeve 206, a lateral bar 208, a lateral sleeve 210, and a plate 212.

Figure 2:
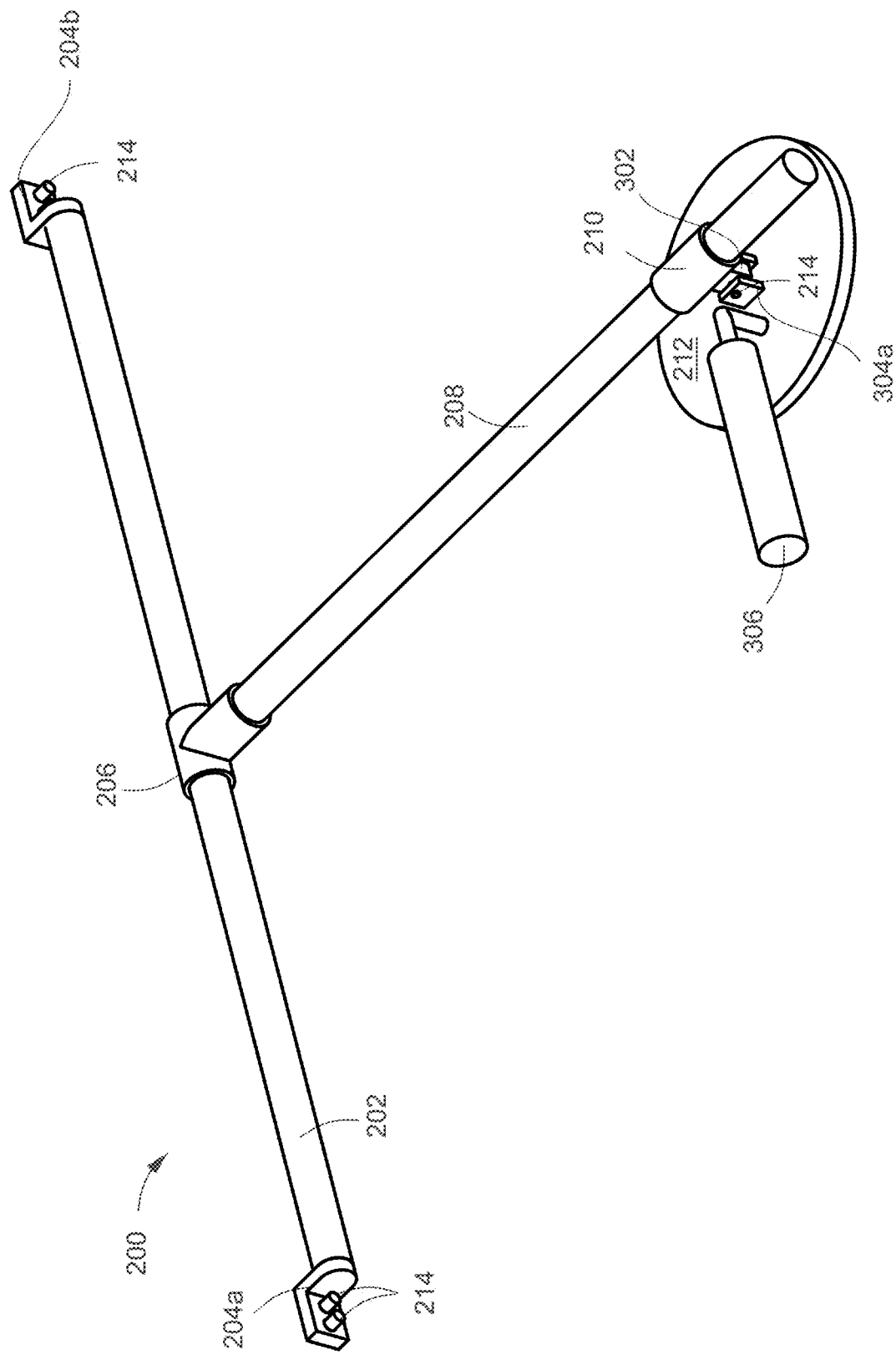
FIG. 2 illustrates a perspective view of an exemplary cook top press assembly plate pivotably coupled to a lateral sleeve coupled to a lateral bar.

FIG. 2 illustrates a perspective view of an exemplary cook top press assembly 200 having a plate 212 coupled to a lateral sleeve 210 coupled to a lateral bar 208. The cook top press assembly 200 may include a cross bar 202, a first bracket 204a, and a second bracket 204b. The two brackets 204a, 204b may be coupled to the back wall 102 (see FIGS. 1A-B). Each bracket 204 may be coupled to the back wall 102 via a bolt 214 threadably extended through each bracket and the back wall. Alternatively, each bracket 204 may be coupled, e.g., welded, to the back wall 102. In some versions, each bracket 204 may have an aperture 402 that receives an end of the cross bar 202. The cross bar 202 may have a first end coupled to the first bracket 204a and a second end coupled to the second bracket 204b. The first end of the cross bar 202 may be rotatably coupled to the first bracket. The second end of the cross bar 202 may be rotatably coupled to the second bracket. In other versions, the ends of the cross bar 202 may be coupled to the brackets 204a, 204b via bolts (not shown). Alternatively, the ends of the cross bar 202 may be coupled to the brackets 204a, 204b via welding. The portions of the brackets 204a, 204b that are coupled to the ends of the cross bar 202 may extend away from the back wall 102. Thus, a space may exist between the back wall 102 and the cross bar 202 (see FIG. 1). In some cases, the cross bar 202 may not be in physical contact with the back wall 102.

Additionally, the cook top press assembly 200 may further include a cross sleeve 206 and the lateral bar 208. The cross sleeve 206 may have an aperture (not shown) that receives the cross bar 202. The cross sleeve 206 and cross bar 202 may be concentric. The cross sleeve may be shorter than the cross bar 202. The cross sleeve 206 may have an inner diameter larger than an outer diameter of the cross bar 202. Thus, the cross sleeve 206 may be slidably coupled to the cross bar 202.

The cross sleeve 206 may have a T-socket. The T-socket may receive an end of the lateral bar 208. In some versions, the lateral bar 208 may be welded to the cross sleeve 206. In other versions, an end of the lateral bar 208 may be welded to an outer surface of the cross sleeve 206. In any case, the coupled cross bar 202, cross sleeve 206, and lateral bar 208 may form the shape of a block letter "T."

In addition, the cross sleeve 206 may be rotated about the cross bar 202. Hence, the lateral bar 208 may be rotatably coupled to the cross bar 202 via the cross sleeve 206. The coupled cross bar 202, cross sleeve 206, and lateral bar 208 may form the shape of a block letter "T."

The lateral bar 208 may have the lateral sleeve 210 slidably coupled thereto. The lateral sleeve 210 may have a first knob 302 extending from an outer surface of the lateral sleeve 210. The knob 302 may be welded to the lateral sleeve 210. The knob 302 may be coupled to one or more fingers 304 extending from the plate 212. The knob 302 may be a planar metallic plate.

A first finger 304a may be welded to the plate 210. A second finger 304b (see FIG. 3) may be welded to the plate 210. The fingers 304a, 304b may be planar metallic plates. The fingers 304a, 304b may each have an aperture (not shown) disposed therethrough. Also, the knob 302 may have an aperture disposed therethrough. The apertures of the knob 302 and the fingers 304a, 304b may be aligned to receive a bolt. Thus, the cross sleeve 206 and the lateral bar 208 may be coupled.

In other versions, an end of the lateral bar 208 may be welded to an outer surface of the cross sleeve 206.

Figure 3:
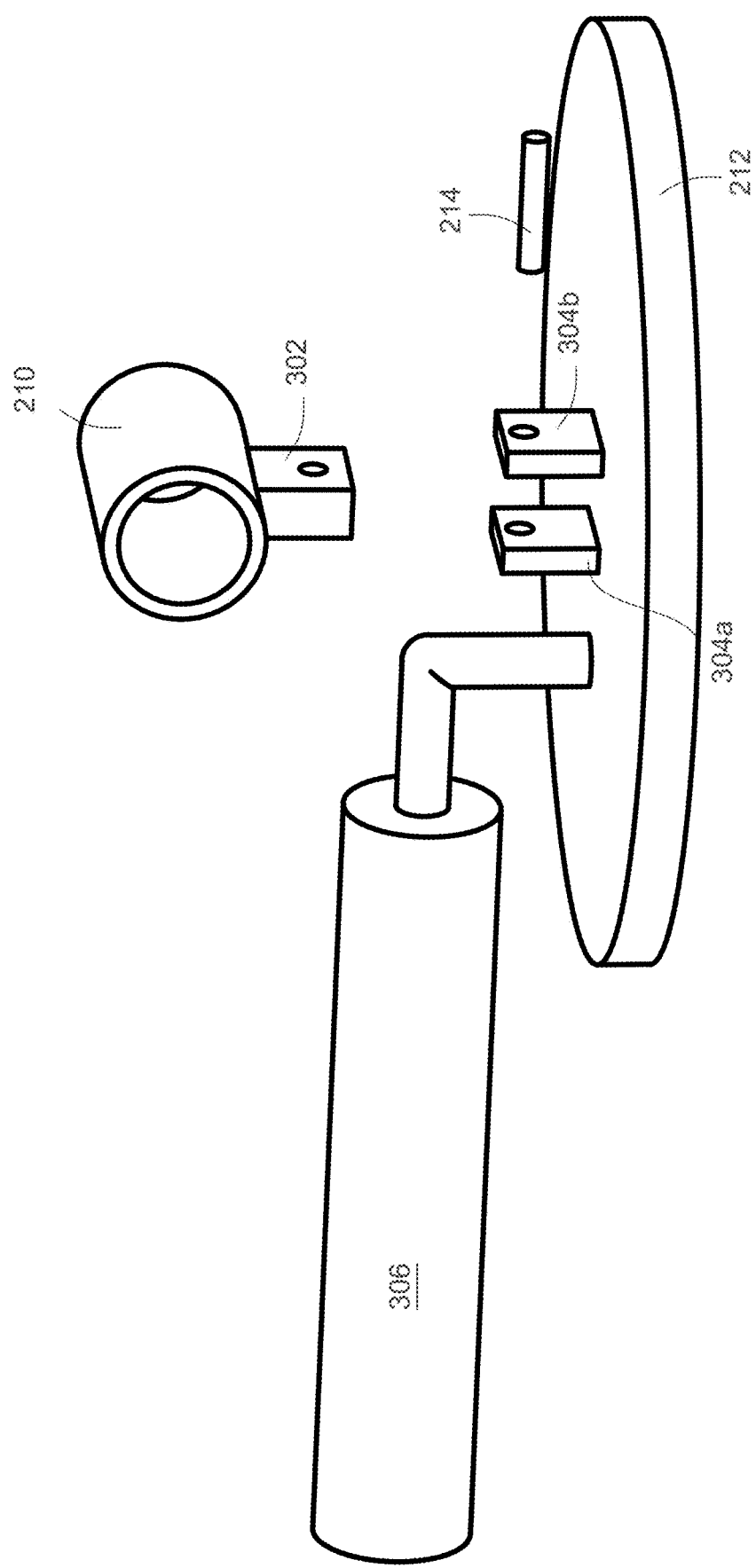
FIG. 3 illustrates an exploded view of a plate, a lateral sleeve, and a pin.

Referring to FIG. 2 and FIG. 3, the lateral sleeve 210 may have an aperture that receives the lateral bar 208. The lateral sleeve 210 and lateral bar 208 may be concentric. The lateral sleeve 210 may be shorter than the lateral bar 208. Thus, the lateral sleeve 210 may be slidably coupled to the lateral bar 208. Further, the lateral sleeve 210 may be rotated about the cross bar. Hence, the lateral sleeve 210 may also be rotatably coupled to the lateral bar 208.

The plate 212 may have a first finger 304a and a second finger 304b. The lateral sleeve 210 may have a knob 302 disposed between the fingers 304a, 304b. The fingers 304a, 304b may extend from an upper surface of the plate 212. The fingers 304a, 304b and the knob 302 may each have an aperture (not shown) disposed therethrough. The apertures may be aligned to receive a bolt 214, e.g. pin. Further, the knob 302 may be pivoted at the bolt 214. Thus, the cross sleeve 206 and the plate 212 may be pivotably coupled. Furthermore, the plate 212 may be slidably coupled to the lateral bar 208 via the lateral sleeve 210.

The plate 212 may include a handle 306 coupled, e.g., welded, to the upper surface of the plate 212.

Figure 4B:
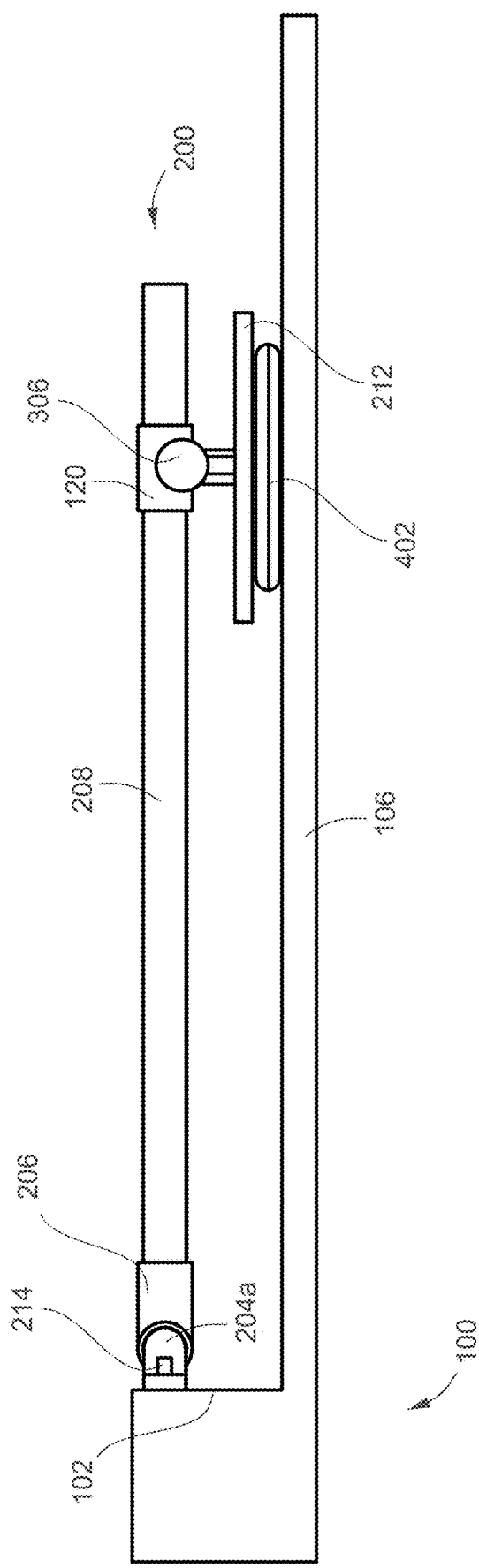
FIG. 4B illustrates a side view of a stove coupled to a cook top press assembly in a pressed position.

FIG. 4A and FIG. 4B illustrate sequences to using a cook top press assembly 200 to press a food item 402, e.g., hamburger patty, steak, fish, or vegetable disposed on a cook top 106 of a stove 100. A lateral sleeve 210 may have a knob 302 pivotably coupled to fingers 304a, 304b of a plate 212. The lateral sleeve 210 may be slidably coupled to a lateral bar 208. The lateral bar 208 may be coupled to a cross sleeve 206. The cross sleeve 206 may be rotatably and/or slidably coupled to a cross bar 202. The cross bar 202 may be coupled to brackets 204. The cross bar 202 may be rotatably coupled to brackets 204. The brackets 204 may be coupled to a back wall 102 of the stove 100.

First, a chef may lift the plate 212, e.g., via a handle 306. Lifting the plate 210 may cause the cross sleeve 206 and the lateral bar 208 to rotate about the cross bar 202. In some cases, lifting the plate 210 may cause the cross bar 202 to rotate on the brackets 204. Next, the chef may push and/or pull the plate 212 forwards, backwards, and/or side-to-side. Pushing and/or pulling the plate 212, e.g., towards or away from the chef, may cause the lateral sleeve 210 to slide along the lateral bar 208. Pushing and/or pulling the plate 212 side-to-side may cause the cross sleeve 206 to slide along the cross bar 202. The chef may push and/or pull the plate 212 until the plate 212 is positioned above the food item 402. Afterwards, the chef may lower the plate 212 until it is abutted against the food item 402. Additionally, the chef may apply pressure onto the food item 402. The food items like ground meat may become flattened from being pressed with the plate 212.

The plate 212 may have apertures (not shown) disposed therethrough. While the food item 402 is being cooked, the chef may leave the plate 212 abutted against the food item 402. Heat and moisture from the food item 402 may pass through the apertures of the plate 212. The food item 402 may be cooked faster when additionally pressed by the plate 212.

What is claimed as the invention is:

1. A food press assembly for pressing food on a stove, comprising:
   a cross bar coupled to the stove;
   a lateral bar coupled to the cross bar;
   a lateral sleeve coupled to the lateral bar;
   a plate coupled to the lateral sleeve and capable of being abutted against a cooking surface of the stove; and
   a handle coupled to the plate;
   wherein the cross bar has a first end rotatably coupled to a first bracket coupled to a wall of the stove, a second end rotatably coupled to a second bracket coupled to the wall of the stove, and a middle portion, between the first end and the second end, that does not physically touch the wall of the stove;
   wherein the lateral bar is orthogonal to and rotatably coupled to the cross bar;
   wherein the lateral sleeve has a knob and is slidable on the lateral bar;
   wherein the plate has a lower surface, an upper surface, and a finger extending from the upper surface, wherein the knob and the finger have a pin extended therethrough; and
   wherein the plate is pivotable relative to the lateral sleeve.

* * * * *